United States Patent
Jiao et al.

(10) Patent No.: US 10,424,075 B2
(45) Date of Patent: Sep. 24, 2019

(54) DEPTH/DISPARITY MAP POST-PROCESSING METHOD AND DEVICE

(71) Applicant: Peking University Shenzhen Graduate School, Shenzhen (CN)

(72) Inventors: Jianbo Jiao, Shenzhen (CN); Ronggang Wang, Shenzhen (CN); Zhenyu Wang, Shenzhen (CN); Wenmin Wang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 22 days.

(21) Appl. No.: 15/565,877

(22) PCT Filed: May 6, 2015

(86) PCT No.: PCT/CN2015/078382
§ 371 (c)(1),
(2) Date: Oct. 11, 2017

(87) PCT Pub. No.: WO2016/176840
PCT Pub. Date: Nov. 10, 2016

(65) Prior Publication Data
US 2018/0061068 A1 Mar. 1, 2018

(51) Int. Cl.
*G06T 7/50* (2017.01)
*G06T 5/50* (2006.01)
(Continued)

(52) U.S. Cl.
CPC ............. *G06T 7/50* (2017.01); *G06K 9/4604* (2013.01); *G06T 5/005* (2013.01); *G06T 5/20* (2013.01);
(Continued)

(58) Field of Classification Search
CPC ... G06T 7/50; G06T 7/136; G06T 7/11; G06T 7/13; G06T 5/005; G06T 5/20; G06T 5/40; G06T 5/50; G06K 9/4604
See application file for complete search history.

(56) References Cited

U.S. PATENT DOCUMENTS

| | | | | |
|---|---|---|---|---|
| 5,156,258 A | * | 10/1992 | Steinkuhl | B65G 19/28 |
| | | | | 198/735.6 |
| 2001/0035502 A1 | * | 11/2001 | Arakawa | G03B 42/02 |
| | | | | 250/484.4 |

(Continued)

OTHER PUBLICATIONS

IEEE Transactions on Pattern Analysis and Machine Intelligence, vol. 35, No. 6, Jun. 2013, Kaiming He et al. Jun. 2013.*

*Primary Examiner* — Qun Shen
(74) *Attorney, Agent, or Firm* — SV Patent Service (57) ABSTRACT

A method and a device for post-processing depth/disparity maps adopt a strategy of combining edge information and segmentation information when detecting irregular edge regions. The method includes dividing a color image into super pixels when performing image segmentation on a color image; partitioning a grayscale range into a preset number of intervals, and for each super pixel, statistically obtaining a histogram of all the pixel points that fall within the intervals; determining, in a current super pixel, whether a ratio of the number of pixels contained in the interval having a maximum interval distribution value, to the total number of pixels in the current super pixel is less than the first threshold; and if so, further dividing the current super pixel using a color-based segmentation method. The disclosed method and device improve accuracy of color image division while ensuring image processing speed, thus improving detection accuracy of the irregular edge regions.

12 Claims, 8 Drawing Sheets

(51) Int. Cl.

| | | |
|---|---|---|
| *G06T 7/11* | (2017.01) | |
| *G06T 7/13* | (2017.01) | |
| *G06K 9/46* | (2006.01) | |
| *G06T 5/00* | (2006.01) | |
| *G06T 5/20* | (2006.01) | |
| *G06T 5/40* | (2006.01) | |
| *G06T 7/136* | (2017.01) | |

(52) U.S. Cl.
CPC ............... *G06T 5/40* (2013.01); *G06T 5/50* (2013.01); *G06T 7/11* (2017.01); *G06T 7/13* (2017.01); *G06T 7/136* (2017.01); *G06T 2200/04* (2013.01); *G06T 2207/10024* (2013.01); *G06T 2207/10028* (2013.01); *G06T 2207/20032* (2013.01); *G06T 2207/20192* (2013.01)

(56) References Cited

U.S. PATENT DOCUMENTS

| | | | | |
|---|---|---|---|---|
| 2009/0109490 | A1* | 4/2009 | Lau | H04N 1/4052 358/3.06 |
| 2009/0190095 | A1* | 7/2009 | Ellinger | G02B 27/2207 353/7 |
| 2011/0255775 | A1* | 10/2011 | McNamer | H04N 5/23293 382/154 |
| 2012/0057776 | A1* | 3/2012 | Tao | G06T 7/536 382/154 |
| 2012/0127267 | A1* | 5/2012 | Zhang | G06T 7/579 348/43 |
| 2012/0249536 | A1* | 10/2012 | Sutou | G06T 7/85 345/419 |
| 2013/0182002 | A1* | 7/2013 | Macciola | H04N 1/387 345/589 |
| 2014/0168202 | A1* | 6/2014 | Bae | G06F 1/1652 345/214 |
| 2014/0267243 | A1* | 9/2014 | Venkataraman | G06T 7/557 345/419 |
| 2014/0270485 | A1* | 9/2014 | Kauff | G06T 5/002 382/154 |
| 2014/0321754 | A1* | 10/2014 | Ruan | G06K 9/4671 382/195 |
| 2015/0110391 | A1* | 4/2015 | Zhou | G06T 7/194 382/164 |
| 2015/0245007 | A1* | 8/2015 | Hyodo | H04N 13/128 382/154 |
| 2015/0254868 | A1* | 9/2015 | Srikanth | H04N 5/23216 348/47 |
| 2016/0307306 | A1* | 10/2016 | Hoerentrup | G06T 5/50 |

* cited by examiner

DEPTH/DISPARITY MAP POST-PROCESSING METHOD AND DEVICE

TECHNICAL FIELD

The present invention relates to the field of 3D image processing, and in particular, to a method and a device for post-processing depth/disparity maps.

BACKGROUND OF THE INVENTION

With the development of technologies and the continuous increase of people's needs, the acquisition of information from the outside world becomes increasingly important. From the earliest black and white photos to the color photos, to the videos that records temporal information, the means to record and show the world continuously improve. 3D technologies that have appeared in recent years greatly improve the ways that humans perceive the world. 3D movies, naked eye TV, virtual reality, augmented reality, and other applications greatly enrich people's lives, and have made some scientific researches more convenient. The critical difference from previous applications is that these applications have additional depth information, which can create 3D visual experiences and enhance the sense of presence. Therefore, depth information has become hot topic for research.

There are a variety of methods to obtain the depth information, which are mainly divided into two types: contact 3D scanning and non-contact 3D scanning. A contact 3D scanner measures 3D coordinates and other information mainly by actual contacts with the measured object, which obtains its depth information. Although this method features high accuracy, contacting a measured object may cause damage to the object. The method is also time-consuming. It is thus seldom used. The other method is non-contact 3D scanning, which can obtain the depth information without contact with the measured object. This method can include active scanning and passive scanning. In active scanning, the depth information is measured by actively transmitting signals or energy to the measured object. In passive scanning, the depth information is obtained via the image information without transmitting energy. Common active scanning methods include time difference ranging, triangulation, and others using a laser range finder, as well as structured light source method via image projection. Common passive scanning methods include stereo matching, the chroma method, and others, which are implemented using algorithms.

Both active scanning and passive scanning generates a depth map corresponding to the measured scene, which is a grayscale image that indicates the depths of objects by color density. From the above descriptions, it is easy to understand that the qualities of the depth maps have a huge impact on later applications. However, the depth maps obtained via the existing methods have various problems such as black holes, irregular edge of objects, etc. For the depth map obtained by active scanning, the noise is generally removed from the depth image by filtering. Relative to active scanning, the stereo matching in passive scanning includes an additional view angle. Thus these depth maps can be repaired using information of the two view angles. In general, the left-right consistency checks are used to detect inconsistent regions, such regions being subsequently treated by filtering, etc. Although depth maps (or a disparity map) of stereo matching are more detailed after processing than active scanning, some black holes and irregular edges still exist.

As mentioned above, the depth information has become a critical technology for many current frontier fields and new applications, which attracts wide attention. Although methods are available for obtaining depth information, due to technical constraints, depth map still includes many quality problems. There have been some methods relating to post-processing of depth maps, but black holes, irregular edges and other artifacts still exist on the depth images after processing, which seriously affect subsequent applications. There is therefore still an urgent need for improving post-processing of depth maps.

SUMMARY OF THE INVENTION

According to an aspect of the present invention, the present invention provides a method for post-processing depth/disparity maps, including:

inputting an image to be processed, wherein the image to be processed is a depth map or a disparity map;

extracting edges from the image to be processed to obtain edge information;

segmenting a color image corresponding to the image to be processed to obtain segmentation information, wherein the step of segmenting a color image includes:

dividing the color image into super pixels;

partitioning a grayscale range into a preset number of intervals; and for each super pixel, statistically obtaining a histogram of all the pixel points falling within the intervals;

determining, in a current super pixel, whether a ratio of the number of pixels contained in the interval having a maximum interval distribution value, to a total number of pixels in the current super pixel is less than a first threshold; and if so, further dividing the current super pixel using a color-based segmentation method;

obtaining an irregular edge region in the image to be processed based on the edge information and the segmentation information; and repairing the irregular edge region.

According to another aspect of the present invention, a depth/disparity map post-processing device is provided, which includes:

an input module configured to input an image to be processed, wherein the image to be processed is a depth map or disparity map;

an irregular edge detection module comprising an edge extraction unit, an image segmentation unit, and an irregular edge detection unit, wherein the edge extraction unit is configured to conduct edge extraction in the image to be processed to obtain the edge information, wherein the image segmentation unit is configured conduct image segmentation of a color image corresponding to the image to be processed to obtain segmentation information, wherein the irregular edge detection unit is configured to obtain an irregular edge region in the image to be processed based on the edge information and the segmentation information, wherein the image segmentation unit is configured to divide the color image into super pixels, to partition a grayscale range into a preset number of intervals, and to statistically obtain a histogram of all the pixel points falling within the intervals for each super pixel, wherein the image segmentation unit is configured to determine, in a current super pixel, whether a ratio of the number of pixels contained in the interval having a maximum interval distribution value, to a total number of pixels in the current super pixel is less than a first threshold; and if so, to further divide the current super pixel using a color-based segmentation method; and an irregular edge repair module configured to repair the irregular edge region.

DETAILED DESCRIPTION OF THE INVENTION

The presently disclosed method and device for post-processing depth or disparity maps overcome shortcomings in conventional techniques for optimizing existing depth/disparity maps. The proposed new method for post-processing depth or disparity maps improves the quality of the disparity map obtained via stereo matching and the quality of the depth map obtained via active scanning.

The disclosed method and device can properly repair error regions and error points, which commonly appear in depth maps and disparity maps. Compared to existing disparity map post-processing methods, the disclosed method and device can find and repair more error regions, can support depth maps obtained by monocular cameras, can offer wider range of applications, and can greatly improve the quality of the depth maps and disparity maps.

The present invention is further described below in details using specific implementation examples with reference to the attached schematic drawings.

Figure 1:
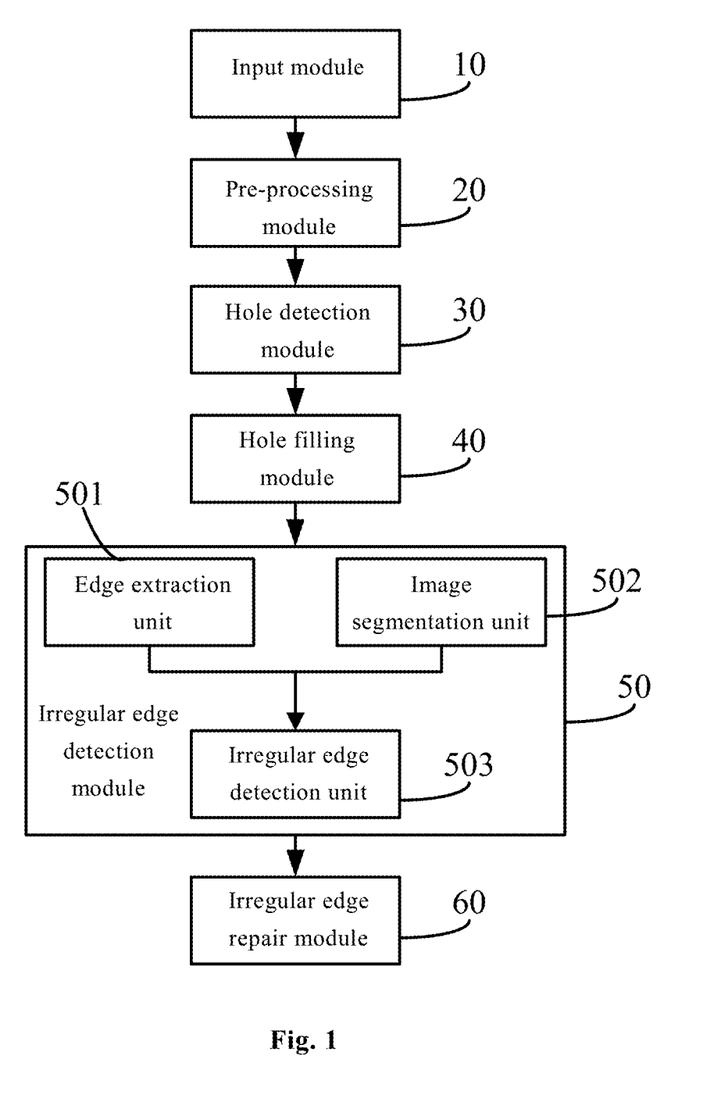
FIG. 1 is a schematic block diagram showing a device for post-processing depth/disparity map according to some embodiments of the present invention.

Referring to FIG. 1, a device for post-processing depth or disparity maps includes an input module 10, a pre-processing module 20, a hole detection module 30, a hole filling module 40, an irregular edge detection module 50, and an irregular edge repair module 60, wherein the irregular edge detection module 50 includes an edge extraction unit 501, an image segmentation unit 502, and an irregular edge detection unit 503.

Figure 2:
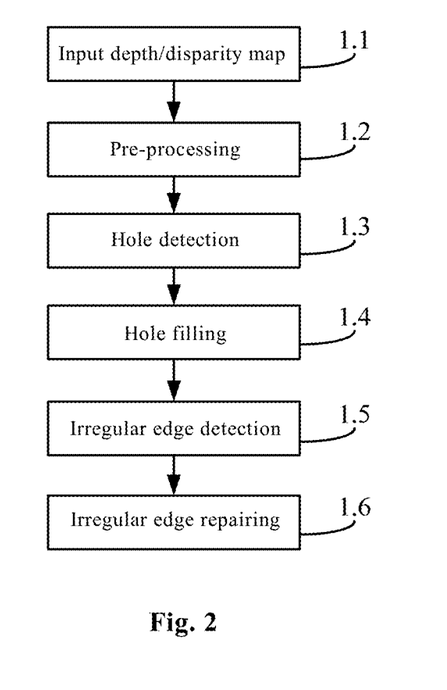
FIG. 2 illustrates a flowchart for a method of post-processing depth/disparity map according to some embodiments of the present invention.

FIG. 2 is a schematic view of a flowchart of a method of post-processing depth/disparity map according to the present embodiment. The method includes the following steps:

Step 1.1. The input module 10 inputs the image to be processed, which may be a depth map or a disparity map.

Step 1.2. When the image to be processed is a depth map, the pre-processing module 20 first preprocesses the depth map to convert the depth map into uniform disparity data. Since the depth map and the disparity map are grayscale images, they are inversely proportional to each other in grayscale. Therefore, when the depth map is preprocessed, the depth map is "inverted". However, it is noted that since the depth map may have many black holes, the simple reverse will make the "black holes" turn white, causing serious interference to the subsequent disparity processing. Thus, reverse processing will not be performed on the holes. The pre-processing of a depth map is performed using the following formula:

$$d(p) = \begin{cases} 255 - D(p), & D(p) \neq 0 \\ 0, & D(p) = 0 \end{cases}$$

wherein D(p) represents the grayscale value of point p in the depth map and d(p) represents the grayscale value of point p in the disparity data (hereinafter referred to as the disparity map).

Step 1.3. The hole detection module 30 performs hole detection on the image to be processed.

After pre-processing, the information to be processed is all disparity data. In the disclosed method, the black holes will be handled first in the optimization of the post-processing of a disparity map. Although "zero disparity" filling is performed on disparity maps obtained adopting the stereo matching in the conventional post-processing techniques, a lot of black holes still remain. The disparity values of these points may not be zero, so they are not filled. These points still belong to error disparity points.

To detect these holes, all points are divided into "high confidence point" and "low confidence point". The determining criterion is whether the disparity value of the point is less than a sufficiently low threshold $d\lambda$, wherein $d\lambda=\lambda*d_{max}$, in which $\lambda$, and $d_{max}$ are respectively the penalty coefficient and the maximum disparity value. A point is determined to be a low confidence point if it is less than the threshold. Otherwise, it is high confidence point. The points are classified according to the degree of confidence. A low confidence point is marked as a "hole", if its confidence is significantly less than that of any point in neighborhood. The calibrating process is as the following formula:

$$\text{Hole}(p) = \begin{cases} 1, & d(q) - d(p) \geq d_\lambda \\ 0, & d(q) - d(p) < d_\lambda \end{cases}$$

wherein Hole(p)=1 indicates that point p is a hole, Hole(p)=0 indicates that it is non-hole. Point q is a neighboring point of point p.

It should be noted that in the present disclosure, the "disparity value" and the "grayscale value" at a pixel point can be regarded as the same concept, as the disparity value at a pixel point is characterized by a grayscale value in a disparity image.

Figure 3A:
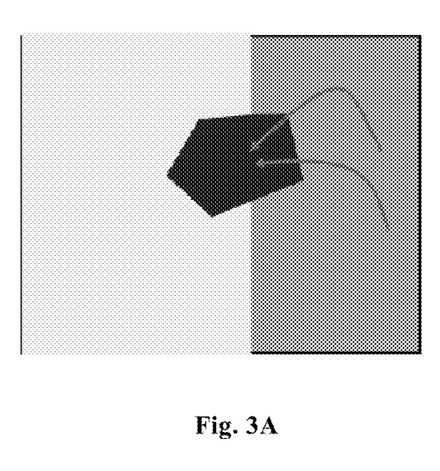
FIGS. 3A and 3B are schematic illustrations of hole filling according to an implementation example of the present invention.
Figure 3B:
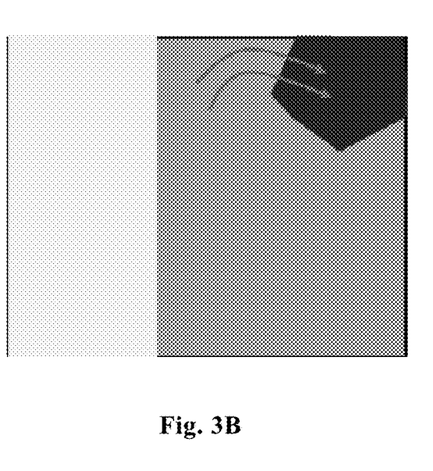

Step 1.4. The hole filling module 40 fills the calibrated holes. The hole is directly filled with a neighboring point having a minimal disparity value in the traditional filling method. Thus, the background points (with the minimum disparity value) to fill a hole (i.e. a zero point) that presumably appears in the background (as shown in FIG. 3A). However, when the hole is located at the edge of an image (as shown in FIG. 3B), it is not possible to fill the hole with any point with a lower value.

Therefore, these two cases are treated different in the disclosed method and device; the filling method is based on the following formula:

$$d^*(p) = \begin{cases} \min[d(p_1), d(p_2)], & [1 - \text{Hole}(p_1)] \cdot [1 - \text{Hole}(p_2)] = 1 \\ \max[d(p_1), d(p_2)], & [1 - \text{Hole}(p_1)] \cdot [1 - \text{Hole}(p_2)] = 0 \end{cases}$$

wherein $d^*(p)$ represents the disparity value of point p after filling, $p_1$ and $p_2$ are neighboring points (e.g. point above, below, on the left or the right of point p). The function of the above formula is as follows: when all neighboring points are detected as non-holes, the current hole is filled with the neighboring point having the minimum disparity value; when any point in neighborhood is detected as a hole, the current hole is filled with the neighboring point having the maximum disparity value.

Figure 4:
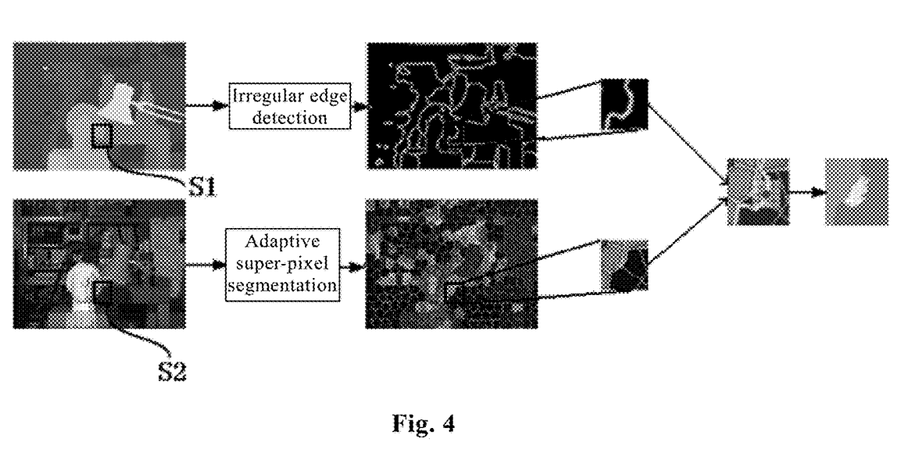
FIG. 4 is a schematic illustration of a flowchart for detecting irregular edges according to an implementation example of the present invention.

Step 1.5. In addition to holes, the error regions in the depth or disparity maps also include irregular regions around edges of objects, which mainly appear as protruding regions with protruding disparity and concave regions with concave disparity, as shown in FIG. 4. The box regions indicated by S1 and S2 are irregular regions, which are referred to as irregular edge regions. To detect these irregular edge regions, the presently disclosed method and device adopts a strategy of combining edge information and segmentation information. The edge extraction unit 501 in the irregular edge detection module 50 extracts edge information in the disparity map. The image segmentation unit 502 in the irregular edge detection module 50 performs segmentation of the original color image to obtain segmentation information. For the edge extraction, the Canny operator is used in disclosed method. For the color image segmentation, the present method has developed a new super pixel-based segmentation method based on "adaptive super pixel". Different from traditional color segmentation methods such as Mean Shift, the super pixel segmentation method has low computational complexity and can significantly increase post-processing speeds. Moreover, it is found that the super pixel segmentation of some regions is not accurate due to relatively fixed scale. Therefore, the present method has used adaptive approach to further improve the accuracy of segmentation.

In the present disclosure, the image segmentation on the color image includes dividing a color image into super pixels; partitioning a grayscale range into a preset number of intervals, and analyzing each of the super pixels statistically to obtain a histogram of all the pixel points falling within the intervals; determining, in a current super pixel, whether a ratio of the number of pixels contained in the interval having a maximum interval distribution value, to the total number of pixels in the current super pixel is less than a first threshold, and if so, further dividing the current super pixel using color-based segmentation. The details are as follows:

First, after a color image is divided into super pixels, the accuracy of all the super pixels is determined, by a method based on proportional ratio each super pixel to the main components. The process can be described as follows: partition a grayscale range into 5 intervals, for example, (0~50), (50~80), (80~150), (150~230), and (230~255); analyze each of the super pixels statistically to obtain a histogram of all the pixel points falling within the intervals. Each histogram distribution is composed of five vertical columns, each representing one of the above intervals. If a ratio of the number of pixels contained in the interval having a maximum interval distribution value, defined as $n_{max}$, to the total number of pixels in the current super pixel, defined as $n_{all}$, is less than a first threshold ρ, the super pixels are marked as insufficiently divided, e.g., $n_{max}/n_{all}<\rho$. Adopting a strategy of main component, when the proportion of the main components in the super pixels is too low, it is determined that the super pixel segmentation is not accurate enough. The current super pixel is then further divided using Mean Shift segmentation method. By adopting the super pixel and the Mean Shift segmentation, the presently disclosed method improves image processing speed and ensures the accuracy of color image division.

At this time, the irregular edge detection unit 503 of irregular edge detection module 50 detects the edge irregular regions using the edge information of the disparity map and the segmentation information of the color image. If there is no error with the edges in the disparity map, the edges should be consistent with the edges of the blocks in the segmentation map. If they are not consistent, there is error with the edges, as shown in FIG. 4. Where an edge passes through a block from the adaptive super pixel segmentation, the edge is determined to be irregular. Moreover, if the irregular edge is in a protruding region, the error region is on the foreground side, and if the irregular edge is in a concave region, the error region is on the background side. For convenient computerized search, a square window is used to determine which side of the irregular edge is marked in the present disclosure. For a point on the irregular edge, a square window is constructed with the point at the center. At this time, the irregular edge divides the window into two portions with different areas. The error region is located on the side with the smaller area, and the error region (i.e. the irregular edge region) can be marked. In particular, if the edge is a vertical or horizontal straight line, the two portions within the square window may have equal area. In this case, the size of the square window is increased until the areas of the two portions are not equal. The irregular edge region can then be determined using the above described method.

Step 1.6. After the irregular edge region is marked in the disparity map, it is repaired by the irregular edge repair module 60. The presently disclosed method uses weighted median filtering repair these error regions. The principle of median filter is to select the median of all points in the range to replace the value of the center point within a certain range. Weighted median filter is a filter that provides different treatments based on the median filter for different points within the range. For example, different weights can be assigned based on colors or distances. In the present method, the filtered kernel of the weighted median filter is a guided filter coefficient. The effect of the guided filter (see Rhemann C, Hosni A, Bleyer M, et al. Fast cost-volume filtering for visual correspondence and beyond[C]//Computer Vision and Pattern Recognition (CVPR), 2011 IEEE Conference on. IEEE, 2011: 3017-3024.) is to keep the image to be filtered consistent with the guided image as much as possible, especially in areas such as the detailed edges.

In order to keep the edge of the disparity map close to the original color image and make full use of the binocular information, a binocular image pair is used as the guided map in the present method. The calculation of the filter kernel coefficient is as follows:

$$W_{p,q}(I) = \frac{1}{|w|^2} \sum_{p,q \in w} \left(1 + \frac{(I_p - u)(I_q - u)}{\Sigma + \varepsilon U}\right)$$

where p and q are pixel points in the square window, |w| is the total number of pixels in the square window, I is the guided image, ε is the smoothing coefficient, and U is the corresponding identity matrix. When the image to be processed is a disparity map, a binocular image pair is used as the guided map. $I_p$ and $I_q$ are 6D vectors, u is a 6D mean vector, and Σ is the 6*6 cross-correlation matrix. When the image to be processed is a depth map, a monocular image is used as the guided map. $I_p$ and $I_q$ are 3D vectors, u is a 3D mean vector, and Σ is 3*3 cross-correlation matrix.

Figure 5:
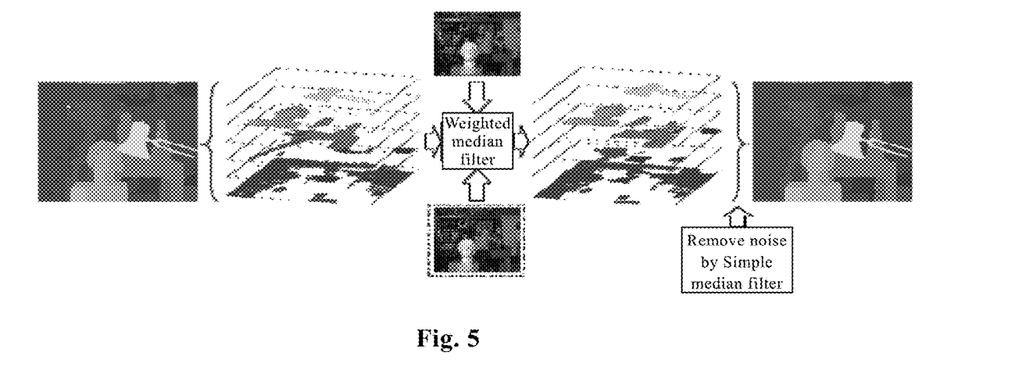
FIG. 5 is a schematic illustration of a flowchart for repairing irregular edge according to an implementation example of the present invention.

The weighted median filtering process is shown in FIG. 5. First, the disparity map to be processed is divided into different layers according to disparity levels. Then the 3D "disparity body" is filtered and combined into a disparity map to complete the repair of the irregular edge region. Finally, noise is removed by simple median filtering.

Figure 6A:
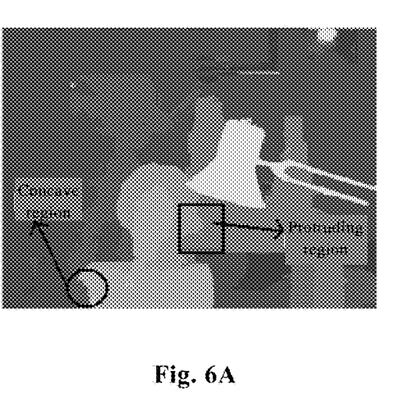
FIGS. 6A and 6B are schematic illustrations for comparing a irregular edge region before and after repair according to an implementation example of the present invention.
Figure 6B:
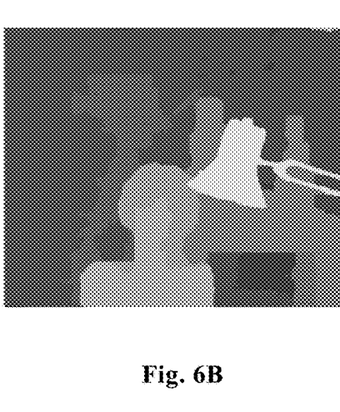

FIG. 6A and FIG. 6B respectively illustrate irregular edge regions before and after the disclosed repair. FIG. 6A shows the regular edge in an image (a protruding region with irregular edge in the box and a concave region with irregular edge in a circle). These regions have been transformed to regular edges, as shown in FIG. 6B, after the described repair operations.

After the above steps are completed, depth or disparity maps with many problems and error regions have been repaired, and their qualities are further improved.

Further, it should be noted that in some embodiments, the edge detection and the filling steps may be omitted in case there are few holes in an image. Only the irregular edge detection and repair steps are performed on the image. Alternatively, hole detection and filling are carried out using the presently disclosed methods.

In order to verify the performance of post-processing depth maps or disparity maps by the disclosed method and the disclosed device, tests were carried out on the disparity map and the depth map. For the disparity map, verification used Middlebury's standard data set and different stereo matching algorithms. For the depth map, the depth map tested is obtained using Kinect, a common depth acquisition device.

Figure 7:
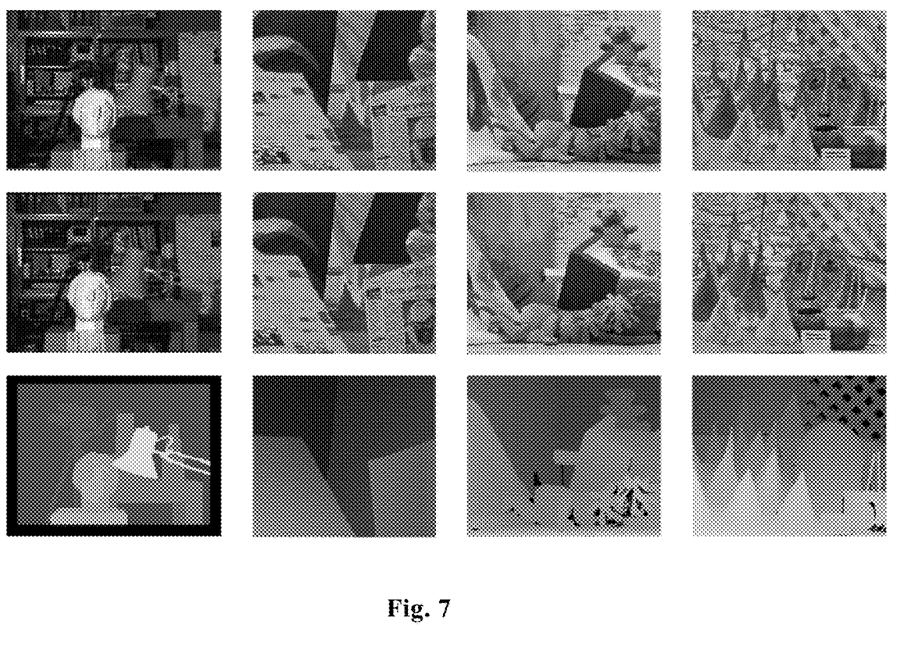
FIG. 7 illustrates images in the Middlebury test set.
Figure 8:
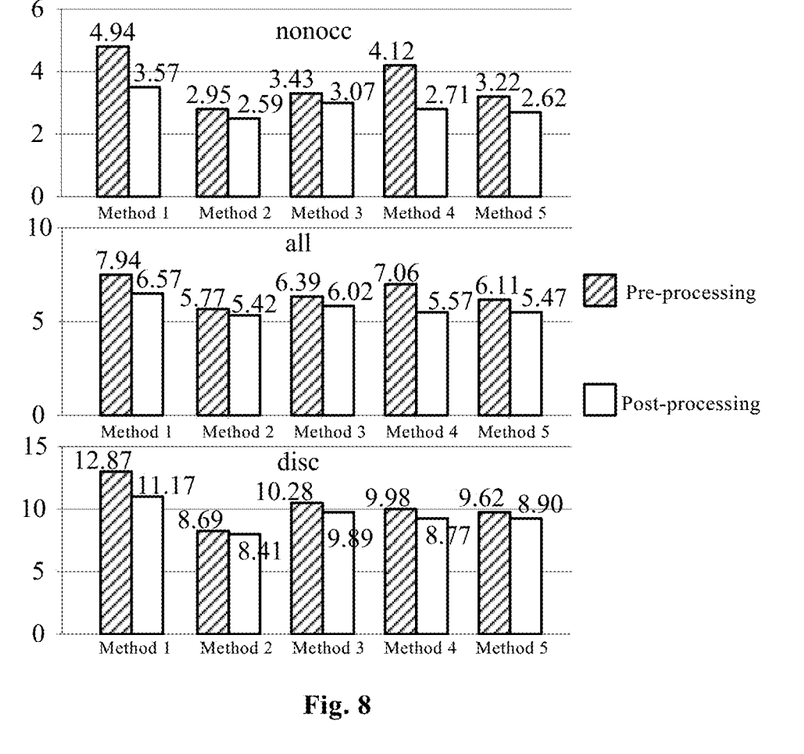
FIG. 8 illustrates the results of local stereo matching algorithms before and after using a method provided by an implementation example of the present invention.
Figure 9:
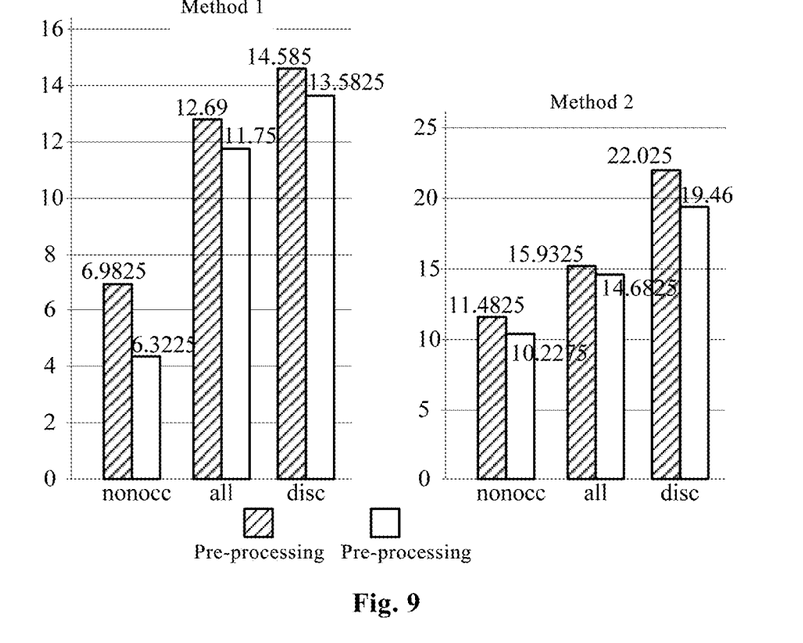
FIG. 9 illustrates the results of global stereo matching algorithms before and after using a method provided by an implementation example of the present invention.

Middlebury (http://vision.middlebury.edu/stereo/) provides a professional test platform for stereo matching and the corresponding test data. The test images chosen are shown in FIG. 7, where the first row corresponds to the left images, the second row corresponds to the right images, and the third row includes standard disparity maps obtained from the different pairs of images from left to right. The performance is verified by applying the disclosed post-processing optimization methods to different stereo matching algorithms. The test algorithms mainly include local algorithm and global algorithm. The results are respectively shown in FIG. 8 and FIG. 9, in which nonocc, all, and disc are three different evaluation indexes, representing respectively the non-occlusion region, all region, and the discontinuity region. The quality of the disparity map is measured using the three different indexes. The vertical ordinate indicates the average error rate, the lower the better. The horizontal ordinate indicates various algorithms. Method 1-Method 5 in FIG. 8 respectively correspond to Box Filter, Guided Filter, Cross Region, Information Permeability, and DTAggr method. Method 1 and Method 2 in FIG. 9 correspond to Graph Cut and Belief Propagation method. The presently disclosed post-processing optimization method has been tested on a variety of stereo matching algorithms. The figures show that the quality has been improved to different extents for different algorithms, which proves the effectiveness of the disclosed method.

Figure 10:
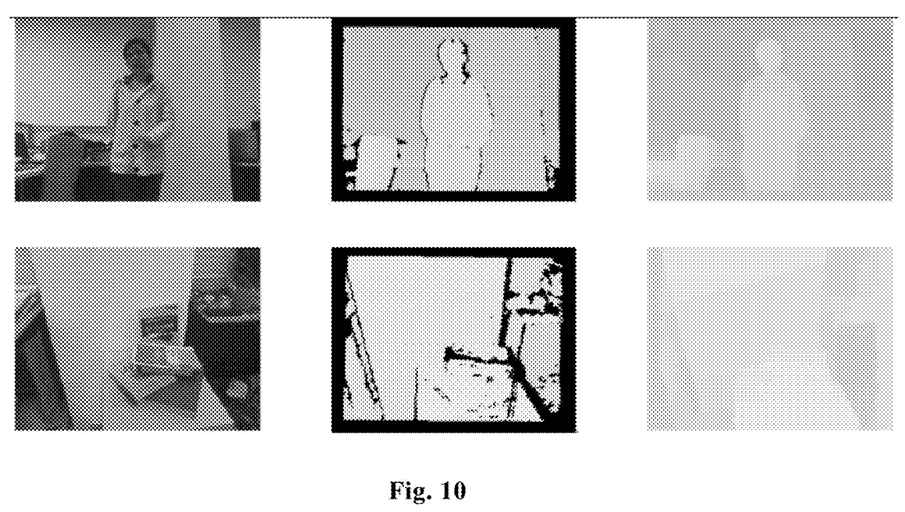
FIG. 10 illustrates the effects of Kinect depth map before and after using a method provided by an implementation example of the present invention.

Further, in order to verify the effect of this disclosed post-processing optimization on the depth map, a depth map obtained using Kinect is selected for testing, with results shown in FIG. 10. The depth map is converted into disparity data for visualization. FIG. 10 shows, from left to right, an original color image, an untreated depth map, and a depth map processed by the present method. It can be seen that the disclosed post-processing method has been greatly improved and enhanced both in the hole regions and along the irregular edges, which demonstrates effectiveness of the disclosed method in post processing data of monocular depth maps.

The effectiveness and applicability of the disclosed method for optimizing post-processing of depth or disparity maps are therefore fully verified via the tests on monocular and binocular depth maps and disparity maps.

It will be understood by those skilled in the field that all or part of steps of various methods according to the embodiments may be programmed to instruct the associated hardware to achieve the goals, which may be stored in a readable storage medium of computer, e.g. read-only memory, random access memory, disk, or CD.

The above contents are further detailed description of the present invention in connection with the disclosed embodiments. The invention is not limited to the embodiments referred to, but may be varied and modified by those skilled in the field without departing from the idea and scope of the present invention.

What is claimed is:

1. A method for post-processing depth/disparity maps, comprising:
   inputting an image to be processed, wherein the image to be processed is a depth map or a disparity map;
   extracting first edges from the depth map or the disparity map to be processed by an irregular edge detection module in a computer device;
   segmenting a color image corresponding to the image to be processed to obtain segmentation information, wherein the step of segmenting a color image includes:
   dividing the color image into super pixels;
   partitioning a grayscale range into a preset number of intervals; and
   for each super pixel, statistically obtaining a histogram of all the pixel points falling within the intervals, wherein the segmentation information includes second edges, wherein a portion of the super pixels are in the second edges;
   determining, in a current super pixel, whether a ratio of the number of pixels contained in the interval having a maximum interval distribution value, to a total number of pixels in the current super pixel is less than a first threshold; and if so, further dividing the current super pixel using color-based segmentation, wherein at least two of the subdivided super pixels have unequal sizes;
   obtaining an irregular edge region in the image to be processed by comparing the first edges with the second edges, wherein the irregular edge region is identified when the first edges differ from the second edges; and
   repairing the irregular edge region by an irregular edge repair module in the computer device.

2. The method of claim 1, wherein a plurality of irregular edge regions are obtained, wherein the irregular edge regions include a protruding region and a concave region, wherein both the protruding region and the concave region are repaired by the irregular edge repair module.

3. The method of claim 1, wherein the step of obtaining an irregular edge region in the image to be processed comprises:
   determining the irregular edge region based on the edge information and segmentation information;
   constructing a square window with its center at a point on an irregular edge, wherein the irregular edge divides the square window into several portions; and
   assigning a portion with smallest area as the irregular edge region.

4. The method of claim 3, wherein the step of repairing the irregular edge region comprises:
   repairing the irregular edge region using a weighted median filter method using a guided filter coefficient as a filter kernel coefficient.

5. The method of claim 4, wherein the guided filter coefficient is defined by:

$$W_{p,q}(I) = \frac{1}{|w|^2} \sum_{p,q \in w} \left(1 + \frac{(I_p - u)(I_q - u)}{\Sigma + \varepsilon U}\right)$$

where p and q are pixel points in the square window, |w| is the total number of pixels in the square window, I is the guided image, c is the smoothing coefficient, and U is the corresponding identity matrix,
wherein when the image to be processed is a disparity map, a binocular image pair is used as the guided map, $I_p$ and $I_q$ are 6D vectors, u is a 6D mean vector, and $\Sigma$ is the 6*6 cross-correlation matrix,
wherein when the image to be processed is a depth map, a monocular image is used as the guided map, $I_p$ and $I_q$ are 3D vectors, u is a 3D mean vector, and $\Sigma$ is 3*3 cross-correlation matrix.

6. The method of claim 1, further comprising:
   prior to the step of extracting edges from the image to be processed, detecting holes and filling the holes in the image to be processed, which comprises the steps of:
   defining a pixel point having a disparity value less than a second threshold as a low confidence point;
   for the low confidence point, when a disparity value of the low confidence point is less than any neighboring point by the second threshold, determining the low confidence point as a hole; repeating the steps of defining and determining to detect all holes in the image to be processed; and
   when all the neighboring points are detected as non-holes, filling the current hole with a neighboring point having minimum disparity value; when any neighboring point is detected as a hole, filling the current hole with a neighboring point with the maximum disparity value; and repeating the step of filling the current hole to fill all holes in the image to be processed.

7. A depth/disparity map post-processing device, comprising:
   an input module configured to input an image to be processed, wherein the image to be processed is a depth map or disparity map;
   an irregular edge detection module comprising an edge extraction unit, an image segmentation unit, and an irregular edge detection unit,
   wherein the edge extraction unit is configured to extract first edges from the depth map or the disparity map, wherein the image segmentation unit is configured conduct image segmentation of a color image corresponding to the image to be processed to obtain segmentation information, wherein the irregular edge detection unit is configured to obtain an irregular edge region in the image to be processed based on the edge information and the segmentation information,
   wherein the image segmentation unit is configured to divide the color image into super pixels, to partition a grayscale range into a preset number of intervals, and to statistically obtain a histogram of all the pixel points falling within the intervals for each super pixel, wherein the segmentation information includes second edges, wherein a portion of the super pixels are in the second edges,
   wherein the image segmentation unit is configured to determine, in a current super pixel, whether a ratio of the number of pixels contained in the interval having a maximum interval distribution value, to a total number of pixels in the current super pixel is less than a first threshold; and if so, to further divide the current super pixel using color-based segmentation, wherein at least two of the subdivided super pixels have unequal sizes; and
   an irregular edge repair module configured to repair the irregular edge region.

8. The device of claim 7, wherein a plurality of irregular edge regions are obtained by the edge extraction unit, wherein the irregular edge regions include a protruding region and a concave region, wherein the irregular edge repair module is configured to repair both the protruding region and the concave region.

9. The device of claim 7, wherein the irregular edge detection unit is configured to determine the irregular edge region based on the edge information and segmentation information, wherein the irregular edge detection unit is configured to construct a square window with its center at a point on an irregular edge, wherein the irregular edge divides the square window into several portions, wherein the irregular edge detection unit is configured to assign a portion with smallest area as the irregular edge region.

10. The device of claim 9, wherein the irregular edge repair module is configured to repair the irregular edge region using a weighted median filter method using a guided filter coefficient as a filter kernel coefficient.

11. The device of claim 10, wherein the guided filter coefficient is defined by:

$$W_{p,q}(I) = \frac{1}{|w|^2} \sum_{p,q \in w} \left(1 + \frac{(I_p - u)(I_q - u)}{\Sigma + \varepsilon U}\right)$$

where p and q are pixel points in the square window, |w| is the total number of pixels in the square window, I is the guided image, c is the smoothing coefficient, and U is the corresponding identity matrix,
wherein when the image to be processed is a disparity map, a binocular image pair is used as the guided map, $I_p$ and $I_q$ are 6D vectors, u is a 6D mean vector, and $\Sigma$ is the 6*6 cross-correlation matrix,
wherein when the image to be processed is a depth map, a monocular image is used as the guided map, $I_p$ and $I_q$ are 3D vectors, u is a 3D mean vector, and $\Sigma$ is 3*3 cross-correlation matrix.

12. The device of claim 7, further comprising:
a hole detection module configured to define a pixel point having a disparity value less than a second threshold as a low confidence point,
wherein for the low confidence point, when a disparity value of the low confidence point is less than any neighboring point by the second threshold, the hole detection module is configured to determine the low confidence point as a hole,
wherein the hole detection module is configured to detect all holes in the image to be processed by repeating operations of defining a pixel point and determining the low confidence point as a hole; and
a hole filling module configured to fill the current hole with a neighboring point having minimum disparity value when all the neighboring points are detected as non-holes, wherein the hole filling module is configured to fill the current hole with a neighboring point with the maximum disparity value when any neighboring point is detected as a hole, wherein the hole filling module is configured to fill all holes in the image to be processed by repeating filling the current hole.

\* \* \* \* \*